A. Carbonel,
Making Clay Sugar Molds,
N° 2,591. Patented Apr. 29, 1842.
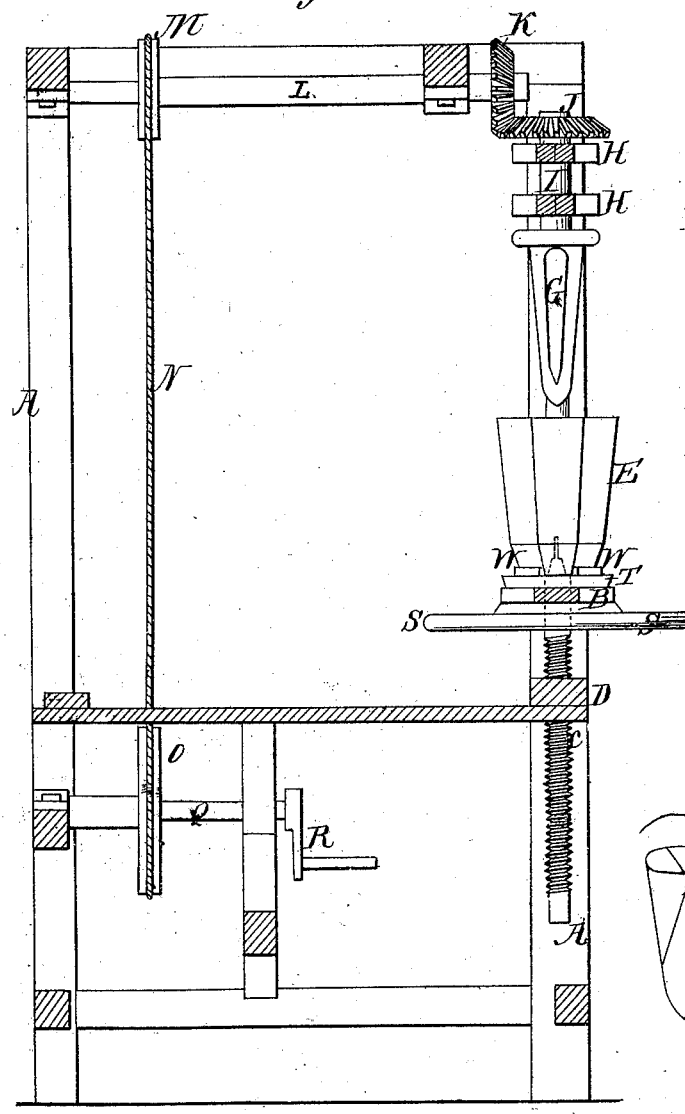
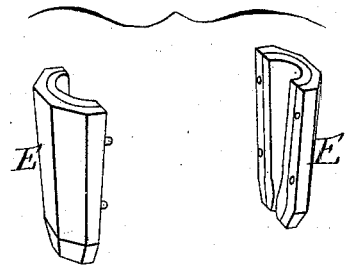
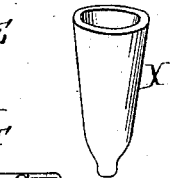
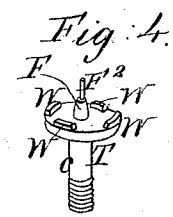
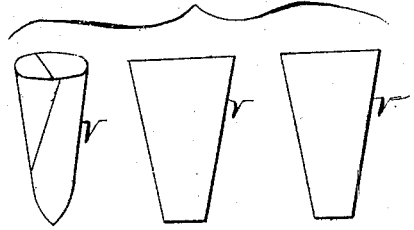

UNITED STATES PATENT OFFICE.

ANTOINE CARBONEL, OF PHILADELPHIA, PENNSYLVANIA.

MAKING SUGAR-MOLDS.

Specification of Letters Patent No. 2,591, dated April 29, 1842.

*To all whom it may concern:*

Be it known that I, ANTOINE CARBONEL, of the city and county of Philadelphia, and State of Pennsylvania, have invented a new and useful Machine for Making Molds, for Casting Sugar-Molds and for Other Purposes and in the Method of Molding, which is described as follows, reference being had to the annexed drawings of the same, making part of this specification.

Figure 1 is an elevation of the machine with one side of the frame omitted in order to represent the operative parts. Fig. 2 is a perspective view of the mold when opened in order to take out the sugar mold cast therein. Fig. 3 is a view of a sugar mold when completed and the cloth or paper stripped therefrom. Fig. 4 is a view of the bottom plate of the mold showing the center pin passing through the center of the said plate for making the aperture in the center of the sugar mold, which is a part of the screw and also the ledges on said plate for preventing the mold turning on the plate. Fig. 5 cloth or other lining and covering of cone and mold.

Similar letters refer to corresponding parts.

A frame A of suitable size, strength, and material is made for containing and supporting the parts hereafter described, the two front posts of which are grooved on the sides next each other for the tongues of a horizontal rising and falling platform or table B to move in and by which said platform is guided and kept in its proper position as it is raised and lowered. This platform rests upon the head S of a large vertical screw $c$, which turns in a fixed nut in the center of a horizontal cross timber D of the frame, by the molder taking hold of the heads of the screw, which is made large and flat for that purpose, and turning it to the right or left; by turning the screw to the right the platform is raised and by turning it to the left it is lowered. Upon this platform is placed the mold E in which the sugar molds are formed. It is made of cast-iron (lined with plaster of Paris or other suitable material, and this again with paper or cloth), V, in three or more parts and put together with dowel pins. It is of a polygonal shape outside. Its shape, inside, corresponds with the shape of the sugar mold X. The lower plate T is separate and lies flat upon the platform B from which plate T rises in the center a small cone or knob F, which is a part of the screw $c$. From the center of this a pin $F^2$ which makes the aperture in the end of the sugar mold. The plate T is fixed to and turns with the screw $c$ and the mold E is prevented from turning on plate T by the projection W. Directly over the mold is placed an inverted cone G or other shaped core corresponding in shape with the interior of the mold, but of less diameter (equal to the thickness of the intended sugar mold), which it forms in the mold by being pressed therein, or by the mold being raised over the cone, the diameter of the cone outside being equal to the cavity of the required sugar mold. It is covered with paper, linen, silk or other suitable material V. This cone G is suspended from a cross timber H of the frame by means of an axle I projecting upward therefrom, which turns in a box in said cross timber, being held in its proper place by collars or shoulders formed on said axle; on the upper end of which is fixed a horizontal bevel cog wheel J by which it is turned horizontally. This inverted cone or core need not be perfectly round in its horizontal cross section, but it must in its vertical section, on one side at least, correspond with the shape of the side or interior of the article to be molded. It may also be made to descend into the mold at the same time that it turns around horizontally—or it may turn horizontally without the descending movement, in which case the mold is raised over it by the screw which will then have a simultaneous vertical and horizontal movement. Or both cone and mold may have the last-mentioned movements, which will also produce the article required equally well. The arrangement of gearing to produce these movements may be various, but that which is represented in the drawing will answer very well for turning the inverted cone horizontally in one place while the mold is turned horizontally and raised over the cone by means of the screw. In either case the clay, in quantity sufficient to form the sugar mold, or article required is put into the interior plaster lining of the cast-iron or other kind of mold having previously covered the inside lining of the mold with a covering V of paper, silk, linen, or other suitable cloth, or material, to prevent the clay sticking to the mold and also covering the cone with the same material, and then by raising the mold over the cone and at the same time giving them both a horizontal revolving movement the article to be manufactured will be perfectly formed and in a very short space of time. The motion of the screw is reversed in order to discharge the mold and prepare it for another similar operation which causes the mold to descend and when below the cone or core it is opened and the article molded discharged therefrom. The gearing used for turning the cone is a vertical bevel cog wheel K fixed on the end of a horizontal shaft L and mashing into the horizontal bevel cog wheel J on the axle I of the cone $b$ which horizontal shaft is turned by means of a pulley M on its opposite end around which is passed a band N leading to another pulley O on a parallel shaft Q on which there is a crank R turned by steam or other power.

The inverted cone or core may be raised and lowered by rack and pinion, in which case the mold must be turned horizontally.

The axes of the molds and cone may also be horizontal and in a direct line—in which case the gearing must be varied in arrangement accordingly.

What I claim as my invention, and which I desire to secure by Letters Patent, is—

The before described mode of making sugar molds by giving to the cast-iron lined mold E, a simultaneous vertical and horizontal movement over the cone or core G for forming the cavity or interior of the article to be molded, while the core or cone itself has a simultaneous horizontal movement.

I likewise claim the mode of molding sugar molds by covering the core and the lining of the mold with paper, linen, or other material to prevent the clay from adhering to them as set forth.

ANTOINE CARBONEL.

Witnesses:
B. R. Morsell,
Saml. Heinecke.